US 7,937,477 B1

(12) United States Patent
Day et al.

(10) Patent No.: US 7,937,477 B1
(45) Date of Patent: May 3, 2011

(54) TRANSPARENT SESSION PERSISTENCE MANAGEMENT BY A CACHE SERVER IN A CONTENT DELIVERY NETWORK

(75) Inventors: Richard David Day, Upton, MA (US); Eric Sven-Johan Swildens, Mountain View, CA (US); Zaide "Edward" Liu, Cupertino, CA (US); Rekha Kodialbail, Milpitas, CA (US)

(73) Assignee: Akamai Technologies, Inc., Cambridge, MA (US)

( * ) Notice: Subject to any disclaimer, the term of this patent is extended or adjusted under 35 U.S.C. 154(b) by 627 days.

(21) Appl. No.: 11/149,741

(22) Filed: Jun. 9, 2005

Related U.S. Application Data

(60) Provisional application No. 60/627,798, filed on Oct. 29, 2004.

(51) Int. Cl.
*G06F 15/173* (2006.01)
(52) U.S. Cl. ....................................... 709/227
(58) Field of Classification Search ............... 707/1, 200, 707/201, 10, 203, 101, 8, 102, 2; 713/153, 713/155, 151, 156, 160, 171, 185, 175, 183, 713/168; 370/401, 338; 380/30, 277; 726/12, 726/14; 705/26; 719/315, 316; 709/227
See application file for complete search history.

(56) References Cited

U.S. PATENT DOCUMENTS

| | | | | |
|---|---|---|---|---|
| 6,338,089 B1 * | 1/2002 | Quinlan | | 709/227 |
| 6,397,253 B1 * | 5/2002 | Quinlan et al. | | 709/227 |
| 6,473,802 B2 * | 10/2002 | Masters | | 709/229 |
| 7,117,504 B2 * | 10/2006 | Smith et al. | | 719/328 |
| 7,177,945 B2 * | 2/2007 | Hong et al. | | 709/238 |
| 7,188,176 B1 * | 3/2007 | Nedderman et al. | | 709/227 |
| 7,228,350 B2 * | 6/2007 | Hong et al. | | 709/226 |
| 7,254,634 B1 | 8/2007 | Davis et al. | | |
| 7,296,076 B1 * | 11/2007 | Portolani | | 709/227 |
| 7,765,304 B2 | 7/2010 | Davis et al. | | |
| 2002/0040400 A1 * | 4/2002 | Masters | | 709/228 |
| 2002/0048269 A1 * | 4/2002 | Hong et al. | | 370/389 |
| 2003/0023744 A1 * | 1/2003 | Sadot et al. | | 709/234 |
| 2004/0024880 A1 * | 2/2004 | Elving et al. | | 709/227 |
| 2004/0068579 A1 * | 4/2004 | Marmigere et al. | | 709/242 |
| 2004/0073604 A1 * | 4/2004 | Moriya et al. | | 709/202 |
| 2004/0153576 A1 * | 8/2004 | Hansmann et al. | | 709/248 |

* cited by examiner

*Primary Examiner* — Jeffrey Pwu
*Assistant Examiner* — Saad A Waqas
(74) *Attorney, Agent, or Firm* — Joshua T. Matt

(57) ABSTRACT

A method and apparatus for establishing session persistence between a client and an origin server are provided. The session persistence can be managed by an intermediate cache server. The persistence is established by inserting an identifier and origin server address in a cookie or URL. Alternatively, the persistence is established by a table mapping a source IP address or a session ID to a specific origin server. Subsequent requests from the same client are mapped to the same origin server using these methods of establishing persistence.

45 Claims, 8 Drawing Sheets

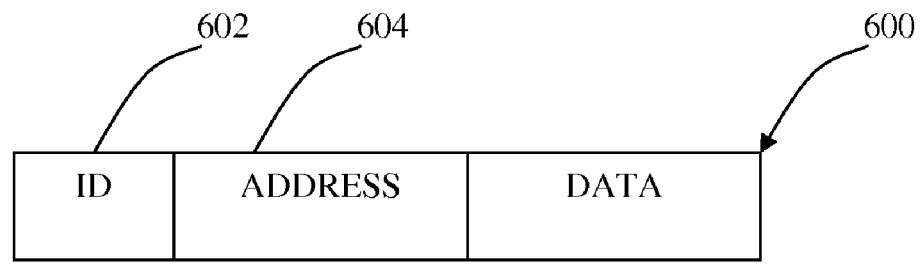
FIG. 6
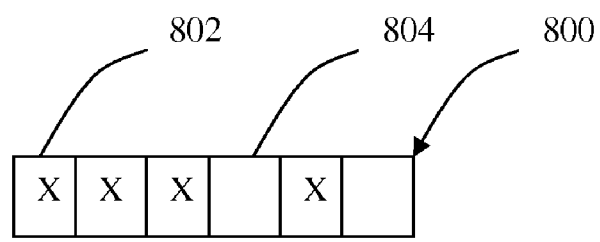
FIG. 7
FIG. 8

TRANSPARENT SESSION PERSISTENCE MANAGEMENT BY A CACHE SERVER IN A CONTENT DELIVERY NETWORK

CROSS-REFERENCE TO RELATED APPLICATIONS; PRIORITY CLAIM

This application claims benefit of Provisional Appln. 60/627,798, filed Oct. 29, 2004, the entire contents of which is hereby incorporated by reference as if fully set forth herein, under 35 U.S.C. §119(e).

FIELD OF THE INVENTION

The present invention relates to the operation of a cache server in a content delivery network. More particularly, the invention relates to the establishment and management of persistent connections by a cache server.

BACKGROUND

The Internet has proven to be a popular and effective method of distributing content. For example, many people access one or more Web sites on the World Wide Web (WWW) each day. Numerous types of content may be accessed using the Internet, such as a Web page, an image file, and streaming video, to name a few examples.

A Content Delivery Network (CDN) is a network infrastructure that deploys many cache servers worldwide to provide content caching for CDN customer Websites. CDN enables the scalability and high availability for content providers without requiring them to invest in expensive Internet infrastructure. CDN global traffic management (GTM) directs Internet requests from end user clients for CDN customer Websites to those cache servers according to load-balancing parameters such as the service availability, network proximity, and system load. The cache server selection is performed by a server load balancer (SLB). Whenever there is a cache miss or client requests are for contents that are dynamic, the cache servers forward the requests to customer origin Web servers, get responses from the customer origin Web servers, and send the responses to the requesting clients.

The SLB spreads the load generated by multiple clients and the risk of failure across multiple servers; each flow from a client is processed by the SLB and assigned accordingly. One issue that arises with this mechanism is so-called session persistence. For example, downloading a Web page, entering information, loading a shopping cart, and purchasing items are all considered to be part of one session for a client. But for an SLB, these are considered to be tens or hundreds of individual sessions or flows.

A Web page consists of many elements or objects, each of which is requested separately. Filling a shopping cart is done by viewing a user multiple Web pages and entering data where desired. When a purchase is performed, the transaction entails moving from HTTP to a secure SSL mode then back again. The shopping cart information is usually stored on the same server as the SSL session. Without session persistence, the SLB would see all these flows as distinct events to be load balanced and the shopping cart information would be scattered over the pool of servers.

One solution is to send the client's requests to the same server each time. Ideally, this would be accomplished by looking at the client's IP address, matching it to previously assigned flows and sending the client to the same server. For a new request, the load-balancing algorithm of choice is used to assign the client to a server. Client-to-server bindings should have a timeout feature that enables a client to visit other sites and still return and connect to the same server, without being assigned to an entirely new server and losing previously entered data.

Most sites mix applications, using HTTP for Web pages, SSL for secure transactions, and an audio or video engine for media streaming. Because each of these sessions uses different port numbers, each is considered by an SLB to be a distinct session. With Sticky Ports, however, the SSL session will be assigned to the same server as the HTTP session. Assigning it to the same server is accomplished by enabling the option during installation of a virtual server. The software allows the administrator to select a configuration that associates multiple application port numbers together.

When a new session arrives at the SLB, the SLB looks to see if a session binding to a server exists between the client IP address and the virtual server IP address and port number combination, or any of the other virtual server port numbers in the sticky port grouping. If a binding already exists between the client and a server, then the new session is sent to the same server. If there is no current binding, then the load balancing algorithm selects the server to which the client session should be sent.

Another issue that must be addressed is when a client goes through a proxy server. Whether as a security precaution or as a way to save public IP address numbers, some proxy servers make all traffic coming from the network they are serving appear to be originating from the same IP address. This is done using a technique known as Network Address Translation (NAT). It is possible that a client may use one IP address for HTTP traffic and another for the SSL (or other port) traffic. The SLB would see this as traffic coming from two different clients and potentially assign the supposed clients to different servers, causing shopping cart data to be unavailable for the checkout application. This problem is solved using one of two techniques: delayed binding or Intrinsic Persistence Checking.

In a delayed binding mode, the SLB initiates a TCP session with each new flow request. To the client it appears that it is talking to the end server and starts to send data to the SLB, which reads the first packet of information and looks for client-specific information. In an HTTP mode, the SLB looks for "cookies" that it or one of the servers has inserted. In an SSL mode, by comparison, the SLB looks at the SSL session ID. In either case, the SLB compares this information with its stored table of server bindings and picks the real server to which the client should go. The SLB then initiates a session with the server, looking like the client, and connects the two together. This is an extremely software-intensive process that puts a limit on the throughput of the SLB and currently works only with SSL or HTTP sessions. In addition, the Sticky Port feature must be running to ensure that the SSL and HTTP traffic goes to the same server.

Another mechanism, called Intrinsic Persistence Checking, manages persistence based on an IP address range instead of source IP address only. The load-balancer accomplishes persistence by applying a "netmask" to the client IP address and comparing the result to existing client/server bindings. If one exists already, then the client is sent to the same server; otherwise, the selected SLB algorithm will choose the server.

Typically the origin server in a CDN is responsible for managing persistence. When the origin server faces heavy traffic, the burden of managing persistence can adversely affect its ability to respond to client requests.

BRIEF DESCRIPTION OF THE DRAWINGS

Embodiments of the present invention are illustrated by way of example, and not by way of limitation, in the figures and accompanying drawings and in which like reference numerals refer to similar elements and in which:

FIG. 6 is a block diagram illustrating the insertion of an identifier and an origin server address in session data according to one embodiment of the invention;

FIG. 7 is a block diagram illustrating a table used to map a client identifier to an origin server according to one embodiment of the invention;

FIG. 8 is a block diagram illustrating a netmask used to map a client source IP address to a range of addresses according to one embodiment of the invention;

DETAILED DESCRIPTION

In the following description, for the purposes of explanation, numerous specific details are set forth in order to provide a thorough understanding of the embodiments of invention described herein. It will be apparent, however, that embodiments of the invention may be practiced without these specific details. In other instances, well-known structures and devices are shown in block diagram form in order to avoid unnecessarily obscuring the description of embodiments of the invention.

Functional Overview

Techniques are discussed for managing persistence through cache servers in a CDN. This reduces the burden on origin servers and can improve overall response time to client requests.

When a cache server receives a new request from a client Web browser, it determines whether the request can be satisfied by content in its cache. If the request can be satisfied by content in the cache server's cache, then the request is satisfied by the cache server. If the request cannot be satisfied by content in the cache server's cache, then the cache server selects an origin server from which the content can be obtained. If persistence is required and managed by the cache server then the cache server ensures that subsequent requests from the same client are directed to the same cache server. A number of methods are used for this purpose.

The cache server can place an identifier and the address of the origin server in an HTTP cookie or a URL parameter. When the same client sends a new request, it includes the HTTP cookie or URL parameter in its request. This is read by the cache server which is then able to route the request to the appropriate origin server.

Alternatively, the cache server may create a table that associates a client or session with a particular origin server. For example, the client's source IP address (or a masked version of the client's source IP address) or an SSL session ID may be used as an identifier. This identifier is placed in a table along with the address of the origin server. For subsequent requests from the same client (or for the same session), the cache server looks up the identifier in the table and maps the client request to the appropriate origin server.

Where more than one cache server is used, the table information must be populated amongst the cache servers. To reduce the overhead expense of this operation, a two-tiered approach limits the cache servers that may respond to a particular client request. Client requests are routed through a first-tier cache server. This is, in turn, associated with a second-tier pool of cache servers. The cache servers in the second-tier pool share table information. Other pools of cache servers in the second tier, however, do not serve the same clients and so the table information is not distributed to those servers.

Content Delivery Networks

Figure 1:
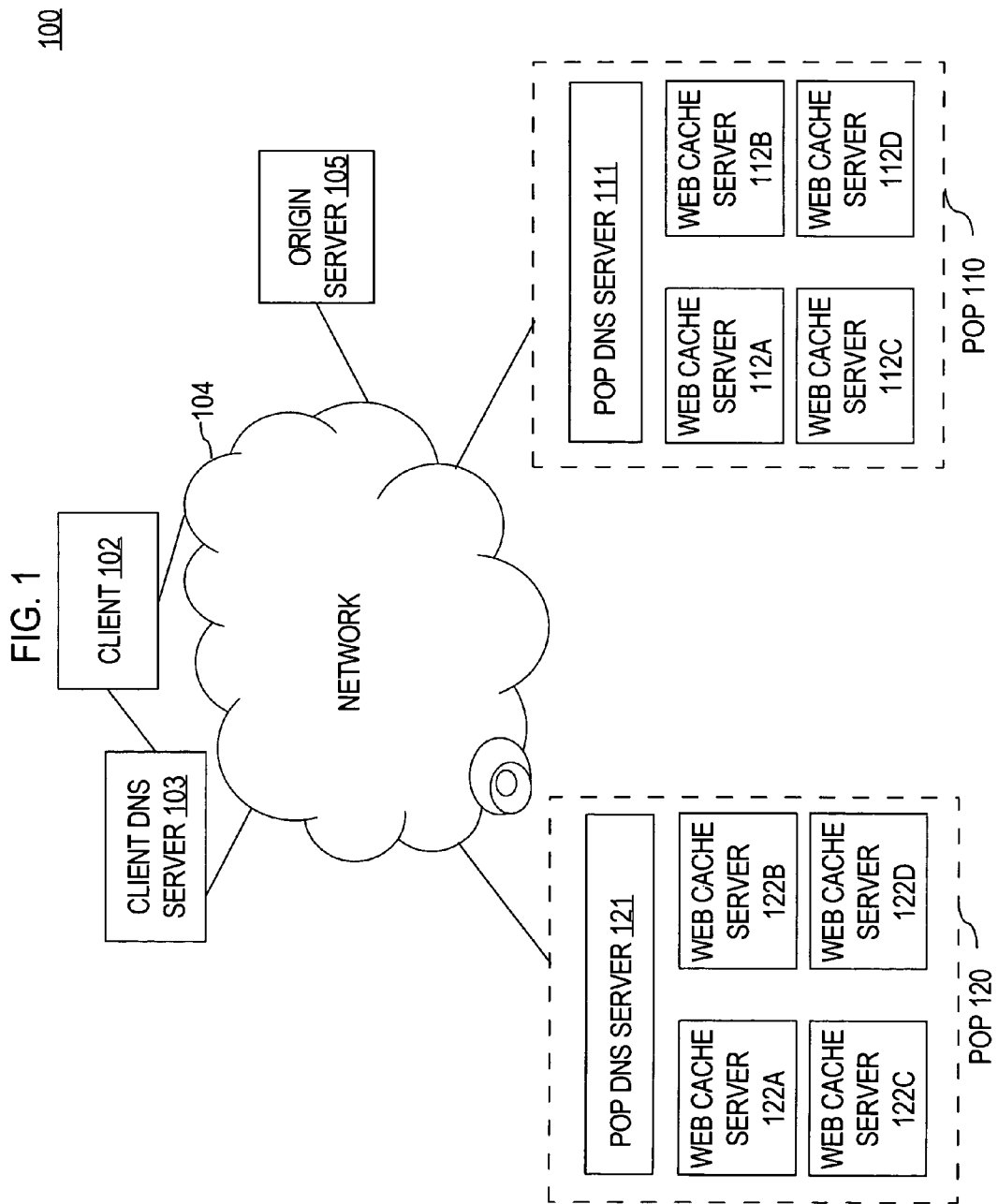
FIG. 1 is a block diagram illustrating a Content Delivery Network, including cache servers and origin servers, in which an embodiment of the invention may be implemented.

FIG. 1 is a block diagram illustrating a system 100 that incorporates a CDN network. An embodiment of the invention can be implemented in a CDN system as described in U.S. Pat. Nos. 6,405,252, 6,754,706, 6,484,143, 6,754,699, and 6,694,358, all owned by the Applicant and incorporated herein by reference. A plurality of Point of Presence sites (POPs) are distributed across the network 104. Here two POPs 110 and 120 are shown. The network 104 is typically the Internet, but can be any other large scale network such as an enterprise intranet.

Each POP 110, 120 contains a plurality of Web cache servers 112A-112D, 122A-122D. Operationally, a Web cache server caches cacheable CDN customer content such as images, video, documents, and static Web page content obtained from the customer's origin server 105 and serves the cached content to client systems 102. The origin server 105 serves dynamic content to the client system 105. The Web cache server can also operate as a mirror server, serving all of the content of an origin server 105.

When a client 102 makes a request for Web content through its Web browser, the request is sent to the client's local DNS server 103 for resolution of the host name. For example, the Web browser may transmit a request to resolve the host name of "www.customer.com" to client DNS server 103. The client DNS server 103 sends a domain name resolution request to a customer DNS server. Since the customer DNS server is configured to delegate its domain to a POP DNS as the authoritative DNS, it tells the client DNS server 103 to contact the authoritative POP DNS IP address for resolution of the request. The client DNS server 103 then sends the request to the authoritative POP DNS server 111.

The authoritative POP DNS server 111 finds an appropriate Web cache server within the Web cache servers 112A-112D in the POP to serve the content to the client based on factors such as traffic load, latency, whether the server is more likely to have the content cached, etc. The authoritative POP DNS server 111 returns the IP address of the Web cache server (e.g., 112A) to the client DNS server 103. The client DNS server 103 sends the address to the client's Web browser.

Once the client's Web browser receives the IP address of the Web cache server 112A, it sends a request for Web content to the Web cache server 112A. The Web cache server 112A receives the request and searches its cache for the requested content. If the requested content is found in the Web cache server's cache, then the content is sent to the client's Web browser. If the content is not found in the Web cache server's cache, then the Web cache server 112A can request the content from the origin server 105.

Figure 2:
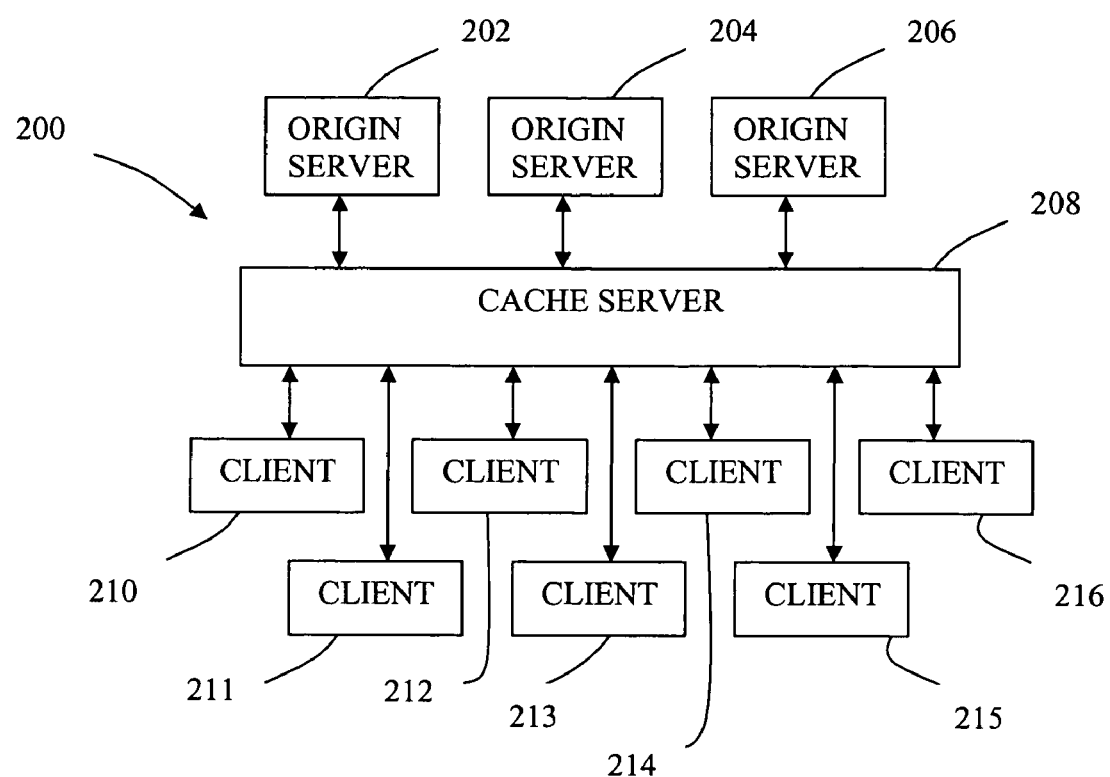
FIG. 2 is a block diagram illustrating connections from clients to a cache server and from the cache server to origin servers according to one embodiment of the invention.

In many applications, multiple origin servers will support a single domain name. FIG. 2 is a block diagram showing components of a CDN network 200 in such a configuration. It includes origin servers 200, 202 and 204, which are associated with a single domain name. A distributed cache server 208 is used to relieve demand from these origin servers. The cache server 208 receives content requests from clients 210-216.

Upon receipt of a request from one of the clients 210-216, the cache server 208 determines whether it can satisfy the request. If so, the request is satisfied directly by the cache server 208. The cache server 208 may, however, determine that the content needs to be obtained from one of the origin servers 202, 204 or 206. A number of circumstances cause the cache server 208 to make such a request. The circumstances can include a simple cache miss—the content is not in the cache server. They can also include a cache fetch due to the expiration of content or a request for dynamic content, which can also be referred to as a cache miss.

On a first cache miss from one of the clients 210-216, the cache server 208 selects one of the origin servers 202, 204 or 206. This selection is made using a SLB as discussed above. Upon receiving a subsequent request from the same client that misses the cache, the cache server 208 will determine whether connection persistence is required. If so, the cache server 208 attempts to route the client's request to the same origin server that responded to its previous request. If not, the cache server 208 uses the SLB to select an origin server that is appropriate for the pending request.

Persistence Selection

Figure 3:
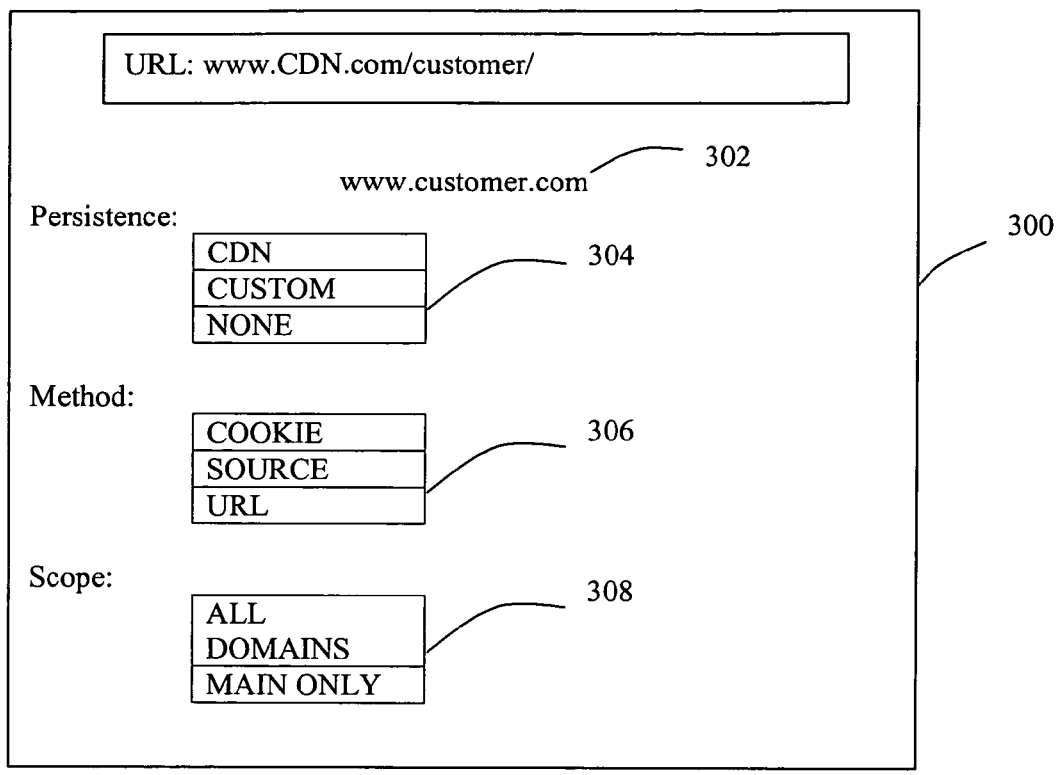
FIG. 3 is a diagram illustrating one Web browser interface for selecting persistence options according to one embodiment of the invention.

FIG. 3 illustrates a user interface 300 through which a persistence policy can be established by an operator of a domain name using the services of a CDN. The operator accesses administration options for the CDN through a Web browser. The operator directs his browser to the CDN's Web page and enters login information. Following this, the operator can choose to manage a persistence policy. The operator enters a top-level domain name which is displayed along with a set of persistence policy options. Any associated names (e.g., "sales.customer.com," "marketing.customer.com," "support.customer.com/partner," and "image.customer.com") are configured through a separate Web page in the user interface 300, which allows persistence policy options to be set in the same manner as the top-level domain name.

The operator's top-level domain name 302 is displayed along with persistence policy choices 304 and method choices 306. For example, the operator may select from the persistence options: "CDN," "CUSTOM," and "NONE." The method choices 306 must also be selected when the operator elects to have the persistence managed by the CDN. For example, the operator may choose to have the persistence managed via: "COOKIE," "SOURCE" or "URL" (described below). If the operator selects "CUSTOM" for the persistence option, the operator will be responsible for managing persistence. When the operator selects "NONE" for the persistence option, no persistence will be applied to client requests through the CDN. These options are further described below.

In addition to the persistence choices 304 and method choices 306, the user interface 300 also presents a scope choice 308. The operator may select to have the persistence choices applied to "ALL DOMAINS" or "MAIN ONLY." For the ALL DOMAINS choice, the persistence selections apply to any sub-level URLs from the top-level domain such as "sales.customer.com" or "www.customer.com/partners." For the MAIN ONLY choice, the persistence selections are applied only to the top-level domain name, "www.customer.com." Sub-level URLs must be set independently. To do so, the operator navigates through the user interface and selects from the same persistence policy choices available for the top-level domain name. There may be additional choices at each level that are not available or applicable to other levels.

When the operator selects "NONE," client connections through the cache server to an origin server are stateless. The routing of a new request from a client will not depend upon previous requests from the same client. This type of persistence is typically used when the content is static for an extended period of time or when each of the origin servers is capable of providing the same content. Thus, the cache server can direct dynamic content requests to an origin server associated with a particular domain name.

Figure 4:
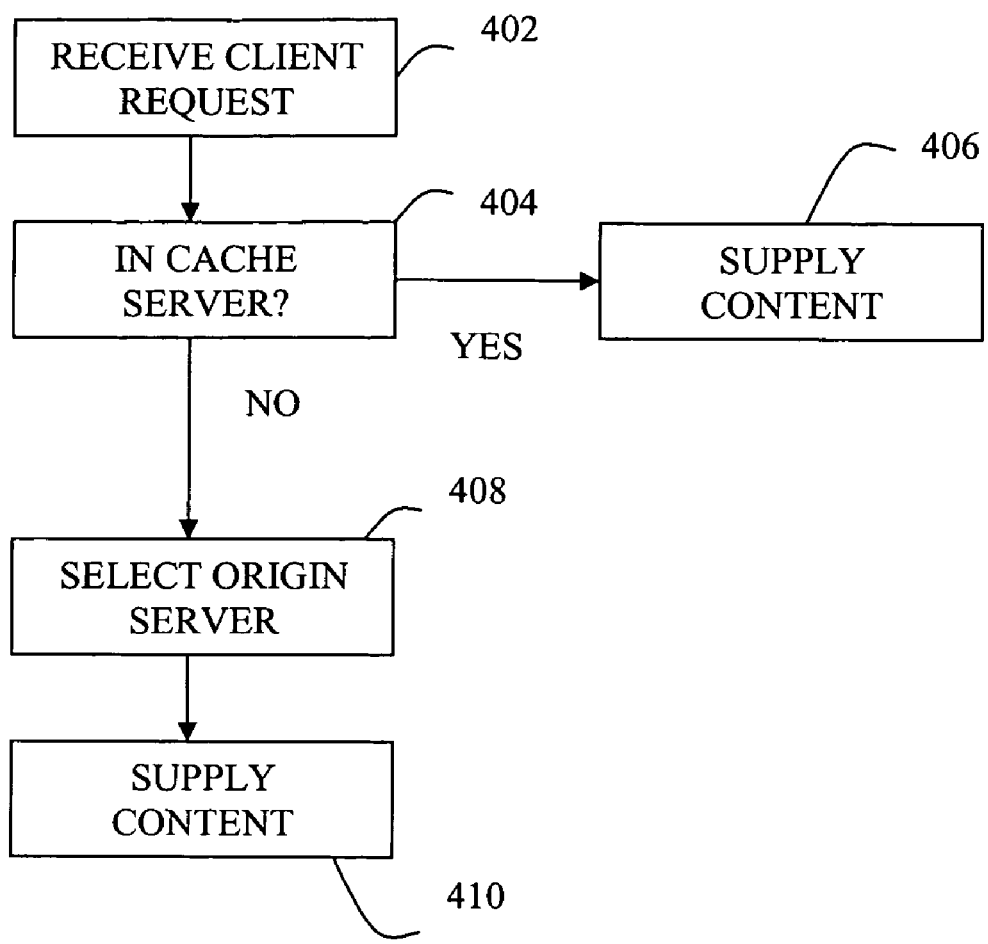
FIG. 4 is a flow chart illustrating functional steps of delivering content to a client through a Content Delivery Network according to one embodiment of the invention.

FIG. 4 illustrates steps for responding to client requests when no persistence is required. A cache server receives a request for content from a client at step 402. The cache server determines whether the request can be satisfied locally at step 404. If the request can be satisfied locally, then the cache server responds directly to the request at step 406. If the request cannot be satisfied locally, then the cache server determines that the request is directed to a URL or sub-URL for which no persistence is required. The cache server uses the SLB to determine which origin server should receive the content request at step 408. The SLB selects an appropriate origin server using its load balancing parameters as described above. The caches server makes the content request to the selected origin server, receives the content from the origin server, and sends the received content to the client at step 410.

When the operator selects "CUSTOM," the origin server defines the session tracking mechanism. The origin server is also responsible for embedding the appropriate tracking token in the selected carrier mechanism, e.g., in a URL or cookie. For example, an origin server address is included as part of a URL returned to the client or is placed in a cookie that is returned to the client. When the same client makes a subsequent request through a cache server, the tracking token is passed back to the cache server as part of either the URL or a cookie from the client. If the request from the client is for static content (e.g., content that does not change that often) and can be satisfied by content stored locally by the cache server, then the cache server responds directly without needing to forward the request to the origin server. However, if the request from the client is for dynamic content (e.g., content with information that changes frequently) and must be satisfied by the origin server with which the client was previously associated, the cache server uses the tracking token to direct the request. Specifically, the origin server address is determined from either the URL or the cookie received from the client. This method is also referred to herein as "customer pass-thru."

Figure 5:
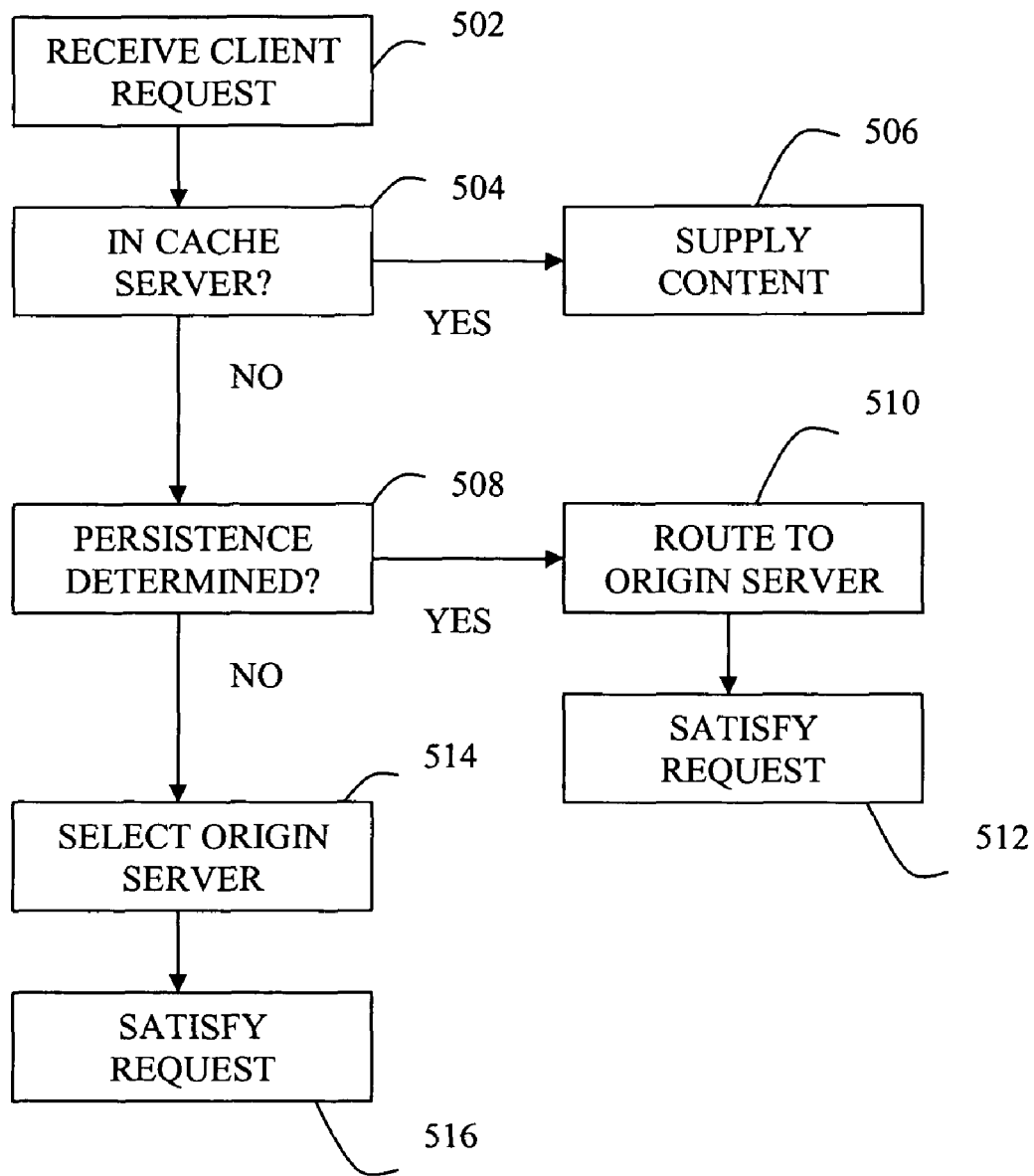
FIG. 5 is a flow chart illustrating functional steps performed by a cache server in establishing persistence between a client and an origin server according to one embodiment of the invention.

FIG. 5 illustrates steps for responding to client requests when persistence is required. A cache server receives a request for content from a client at step 502. The cache server determines whether the request can be satisfied locally at step 504. If so, the cache server responds directly to the request at step 506. If not, the cache server determines that the request is directed to a URL or sub-URL for which persistence is determined by the origin server. The cache server determines whether persistence has already been set at step 508. If so, the cache server routes the request to the specified origin server at step 510. The request is then satisfied by the specified origin server at step 512.

Returning to step 508, if the cache server determines that the persistence has not been previously set, it uses the SLB to determine which origin server should receive the content request at step 514. The cache server makes the content request to the selected origin server, receives the content from the origin server, and sends the requested content to the client at step 516.

When the operator selects "CDN," the cache server is responsible for managing the session tracking mechanism. The type of tracking mechanism is determined by the operator's selection through the user interface of FIG. 2. Types of tracking mechanisms are further described below. The process of inserting persistence information and responding to a client request follows the same steps as shown in FIG. 5. The principle difference between "CUSTOM" and "CDN" persistence is that for CUSTOM, the origin server is responsible for inserting persistence information into an appropriate carrier whereas for CDN the cache server is responsible for inserting persistence information into the appropriate carrier. One benefit of performing the insertion at the cache server is that it reduces the burden on the origin server(s).

CDN Session Tracking

The operator of a domain name can select a number of different ways to track a session to ensure persistence. These include: (1) HTTP cookies; (2) URL parameters; (3) Client source IP address binding; (4) Client source IP range mapping; and (5) SSL session IDs. These different methods are discussed in turn.

For HTTP cookies, the cache server inserts a cookie in the HTTP response. The cookie consists of an identifier (or magic number) and an address. The identifier is used to identify that this is a session that has a persistence property and that the cache server must make sure to apply session persistence to it. With the identifier, the cache server can easily separate non-persistent versus persistent sessions. The identifier can be simply a special alphanumeric string. The address is merely the address of the selected origin server to which the client and session have been matched. This is sometimes referred to as making the client or session sticky to the origin server. This type of persistence can be performed by the cache server or by the origin server. When it is performed by the origin server, the cache server is able to support the persistence by reading the cookie data inserted by the origin server when the client sends the cookie to the cache server.

For URL parameters, the cache server largely follows the method for HTTP cookies. The principle difference is that the cache server puts the identifier and address into the URL parameters instead of a cookie. For subsequent requests in the same session, the cache server can easily locate this special identifier and directly forward the dynamic content requests to the origin server specified in the URL parameters. Like HTTP cookies, persistence based upon URL parameters can be performed by the cache server or by the origin server. Where it is performed by the origin server, the cache server is able to support the persistence by reading the identifier and address inserted in the URL by the origin server.

FIG. 6 illustrates a cookie or URL used for session persistence. The cookie or URL is provided as data in response to a client request. The data 600 includes content and other session information. The cache server inserts the identifier 602 and the address 604 as part of the data 600.

For client source IP address binding, the cache server creates a table binding a client address to a selected origin server. FIG. 7 shows a client-origin binding table 700. The table 700 includes entries for a client ID, which is shown as column 702. These are mapped to an origin server. The table 700 includes entries for the address of the origin server, which is shown as column 704. When a new client address is received and is matched to an origin server, a new entry is added to the table. Each entry has a client ID and an address for an origin server. For subsequent requests from the same client address (whether they belong to the same session or different sessions), the cache server uses the table 700 and directs the dynamic content requests to the origin server that is bound to the client.

For client source address range mapping, the cache server applies a netmask to the client source address. FIG. 8 shows a netmask 800. It consists of inactive segments 802 as well as active segments 804. Application of the netmask to a client source address yields an abbreviated version of the client source address, effectively grouping clients together. The cache server then follows a table (such as shown in FIG. 7) to map the abbreviated version of the client source address to an origin server. The table binds a range of the source IP addresses to a selected origin server. The table 700 is designed to allow a cache server to distribute client requests amongst origin servers in an efficient manner. For subsequent requests from clients that fall into the source address range, the cache server uses the table and directs the dynamic content requests to the origin server that is bound to the address range.

When a new client source address is received by the cache server, the masked version is applied to the lookup table 700. If a matching entry is found, the request is bound to the corresponding origin server address. If a matching entry is not found, the request is not yet bound to any particular origin server—the SLB selects an origin server. The cache server then adds a new entry consisting of the new masked version of the client source address and the address of the selected origin server to the table 700.

For SSL session ID, the cache server extracts the SSL session ID. It again creates a table (such as shown in FIG. 7) that binds the SSL session ID to a selected origin server. For subsequent requests from the same SSL session, the cache server uses the table and directs the dynamic content requests to the server that is bound to the SSL session ID. For new requests, the cache server adds a new entry to the table.

Synchronization of Client-Origin Binding

As shown in FIG. 1, a CDN network will typically include a number of Web cache servers 112A-D and 122A-D. In operation, a request from a client will not necessarily be routed to the same cache server. This will depend upon the type of load-balancing used by the POP sites supporting a particular domain name. Where session persistence is established using HTTP cookies or URL parameters, any cache server can properly direct a request from a client to the same origin server simply by reading the HTTP cookie or the URL parameters. Thus session tracking or persistence using HTTP cookies or URL parameters is independent of the cache server. This is not the case for other methods of establishing persistence as described above.

For example, if a particular cache server has established an entry in a binding table (as shown in FIG. 7), and a subsequent request from the same client is routed to another cache server, it needs to access the binding table of the first cache server or it selects a new origin server based upon current load balancing factors. Permitting the second cache server to choose a new origin server would defeat session persistence because there would be no guarantee that a second request from the same client would be routed to the same origin server.

According to an embodiment of the invention, requests from the same client session are routed to the same cache server. By ensuring that such a request is always scheduled to the same cache server, the same table will be available for routing the request to the appropriate origin server. This basically requires session persistence for cache servers. In this configuration, a source IP or source address range is used to direct all subsequent requests from a client to the same cache server. One disadvantage of this mechanism is that it can sacrifice the fine-grain load-balancing that is achieved using the SLB's load balancing algorithms and potentially make some cache servers overloaded while making other cache servers under-loaded.

According to another embodiment of the invention, the various cache servers populate or share binding tables for (1) Client source IP address; (2) Client source IP range mapping; and (3) SSL session IDs. Thus, each cache server has access to the same persistence information and can properly route a request. This method is particularly suitable for relatively small CDNs having a limited number of cache servers. For larger CDNs with a substantial number of cache servers, the overhead of populating the binding tables can become too expensive in terms of network resources.

According to yet another embodiment of the invention especially suited to larger CDNs, a two-tiered architecture is used to limit the pool of cache servers designated to respond to a particular client request. The first tier is responsible for routing requests from a particular client to a selected pool of cache servers. The second tier is responsible for responding to requests. By limiting the size of the second tier, a smaller subset of cache servers is used. Thus, the binding tables do not need to be distributed to all cache servers, only those in the smaller subset. By limiting the size of this subset, the expense of actively distributing the binding tables is reduced to an operational level.

Using the architecture shown in FIG. 1, requests from a Web browser 102 are routed to a single POP 110. The POP 110 includes a POP server 111 and a plurality of cache servers 112A-D. Binding tables are distributed amongst the cache servers 112A-D. By limiting the distribution to only cache servers in POP 110, the overhead associated with this process is reduced.

Origin Server Failure

From time to time an origin server may be down due to scheduled maintenance or unexpected failure. When persistence is managed at the cache server level, the cache server can detect a failure of an origin server and re-route a client request to another origin server. This process is transparent to the client.

Figure 10:
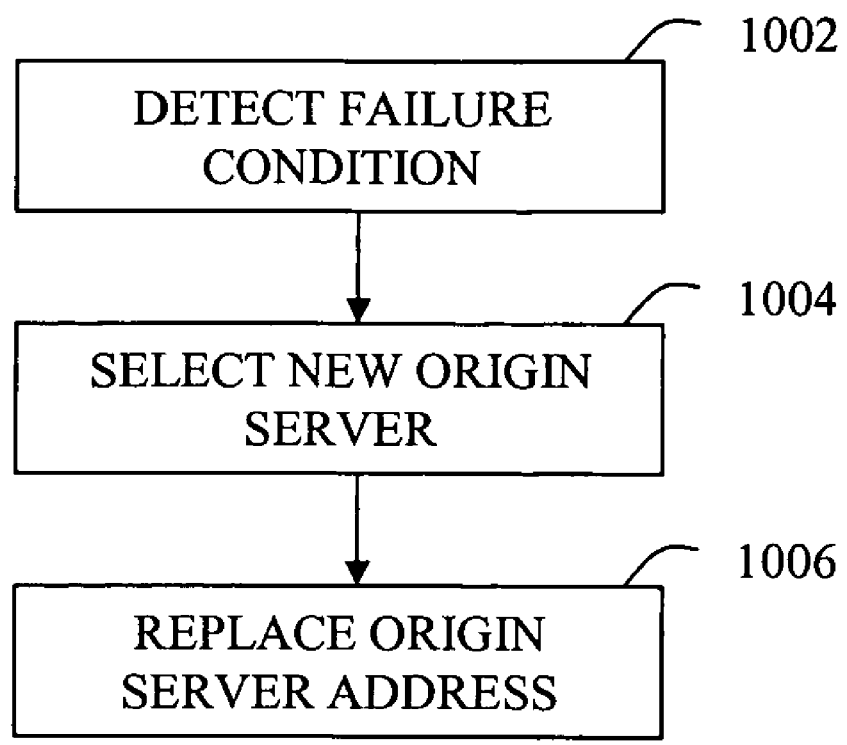
FIG. 10 is a flow chart illustrating functional steps performed by a cache server in substituting a new origin server for a failed origin server.

FIG. 10 illustrates steps taken by a cache server in re-routing a client request upon detection that an origin server is down. Any cache server that is trying to forward a dynamic content request to an origin server detects the failure condition of the origin server at step 1002. The cache server selects a new origin server that is healthy and least loaded at step 1004. When the cache server is responsible for managing persistence, it determines which type of persistence applies. For HTTP-cookie-based or URL-parameter-based persistence, the cache server deletes the existing origin server address and inserts a new origin server address in the HTTP cookie or URL parameters. For persistence managed though a table, the cache server replaces the existing origin server address with a new origin server address in the appropriate entry of the table. This replacement is made at step 1006.

When persistence is managed by the origin server, the same steps are taken by the origin server. The new origin server would be responsible for inserting its address into the appropriate carrier.

Implementation

Figure 9:
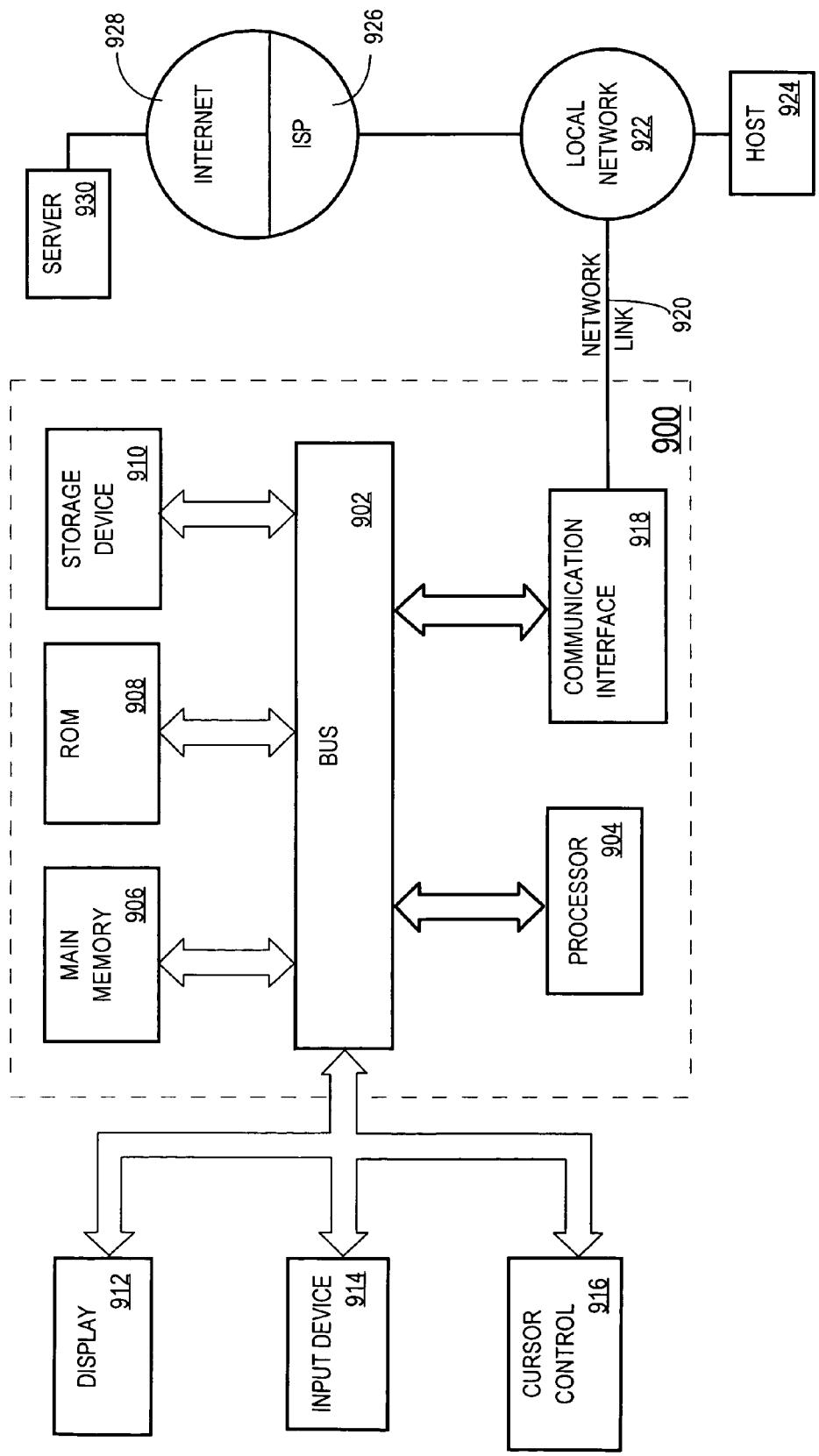
FIG. 9 is a block diagram of a computer system upon which an embodiment of the invention may be implemented.

A client, a cache server, and an origin server may each be implemented on a computer system according to an embodiment of the invention. Each functional aspect described above may be implemented as a module in hardware or software. FIG. 9 is a block diagram that illustrates a computer system 900 upon which an embodiment of the invention may be implemented. Computer system 900 includes a bus 902 or other communication mechanism for communicating information, and a processor 904 coupled with bus 902 for processing information. Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

The invention is related to the use of computer system 900 for implementing the techniques described herein. According to one embodiment of the invention, those techniques are performed by computer system 900 in response to processor 904 executing one or more sequences of one or more instructions contained in main memory 906. Such instructions may be read into main memory 906 from another machine-readable medium, such as storage device 910. Execution of the sequences of instructions contained in main memory 906 causes processor 904 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 900, various machine-readable media are involved, for example, in providing instructions to processor 904 for execution. Such a medium may take many forms, including but not limited to, non-volatile media, volatile media, and transmission media. Non-volatile media includes, for example, optical or magnetic disks, such as storage device 910. Volatile media includes dynamic memory, such as main memory 906. Transmission media includes coaxial cables, copper wire and fiber optics, including the wires that comprise bus 902. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 904 for execution. For example, the instructions may initially be carried on a magnetic disk of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the worldwide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are exemplary forms of carrier waves transporting the information.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution. In this manner, computer system 900 may obtain application code in the form of a carrier wave.

Construction of Claims

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method of managing session persistence through a cache server in a content distribution network, comprising:

receiving, via a user interface and from an operator of an origin server associated with a domain name in a content distribution network, a selection of at least one persistence option from among a plurality of persistence options that include: cache-server-based persistence, in which one or more cache servers in the content distribution network are responsible for establishing persistence, and origin-server-based persistence, in which one or more origin servers are responsible for establishing persistence;

wherein, for the selection by the operator of the origin server comprising cache-server-based-persistence, the one or more cache servers establishes an association between a client and an origin server by performing at least one action selected from a group of actions that are: (i) with the one or more cache servers, sending a cookie to the client, the cookie including both an identifier indicating use of session persistence and an address associated with the origin server; (ii) with the one or more cache servers, sending a URL to the client, the URL including both an identifier indicating use of session persistence and an address associated with the origin server; (iii) with the one or more cache servers, entering a client IP address and the origin server address in a look-up table that associates the client with the origin server so as to establish session persistence; and (iv) with the one or more cache servers, entering a SSL session identifier and the origin server address in a look-up table that associates the session with the origin server so as to establish session persistence;

wherein, for the selection by the operator of the origin server comprising origin-server-based persistence, the one or more origin servers establishes an association between a client and an origin server by performing at least one action selected from a group of actions that are: (i) with the one or more origin servers, sending a cookie to the client via one or more cache servers, the cookie including both an identifier indicating use of session persistence and an address associated with the origin server; and (ii) with the one or more origin servers, sending a URL to the client via one or more cache servers, the URL including both an identifier indicating use of session persistence and an address associated with the origin server;

receiving a first content request from the client at a cache server;

sending the first content request to an origin server selected by the cache server upon determining that the first content request cannot be satisfied by content in a cache associated with the cache server, wherein the cache server selects the origin server based on the association between the client and the origin server established according to the at least one persistence option selected by the operator of the origin server;

receiving first content at the cache server from the origin server in response to the first content request; and sending the first content from the cache server to the client.

2. The method of claim 1, wherein the at least one persistence options is independently selectable for each of a plurality of sub-URLs associated with the domain name.

3. The method of claim 1, further comprising receiving, via the user interface and from the operator, a selection of at least one of cookie-based persistence, client-IP-based persistence, and URL-based persistence.

4. The method of claim 1, wherein the step of receiving the first content request from the client comprises receiving a request for static content.

5. The method of claim 1, wherein the step of receiving the first content request from the client comprises receiving a request for dynamic content.

6. The method of claim 1, further comprising:
determining that the client does not have an association with any origin server; and
selecting, with the cache server, an origin server from a plurality of origin servers associated with a specific domain name.

7. A method of operating cache servers in a content distribution network comprising:
receiving, via a user interface and from an operator of an origin server associated with a domain name in a content distribution network, a selection of a persistence option that comprises cache-server-based persistence, in which one or more cache servers in the content distribution network are responsible for establishing persistence by sending a client at least one of (i) a cookie including an identifier indicating use of session persistence and an address associated with an origin server, and (ii) a URL including an identifier indicating use of session persistence and an address associated with an origin server;
receiving a first request for content from a client at a first cache server in a content distribution network;
sending the first request for content to an origin server upon determining that the first request for content from the client cannot be satisfied with content stored in a first cache associated with the first cache server;
receiving and storing first content from the origin server at the first cache server;
sending the first content received from the origin server to the client;
sending the identifier and the origin server's address to the client;
receiving a second request for content from the client at a second cache server in the content distribution network;
sending a second request for content to the origin server upon determining that the second request for content from the client cannot be satisfied with content in a second cache associated with the second cache server and upon determining from the identifier that persistence is being used;
receiving second content at the second cache server from the origin server;
sending the second content received from the origin server to the client; and
upon detection of a failure condition of the origin server by the second cache server, selecting, by the second cache server, a new origin server and sending, by the second cache server, the new origin server address to the client.

8. The method of claim 7, wherein the step of receiving the first request for content comprises receiving a request for dynamic content.

9. The method of claim 7, wherein the step of receiving the first request for content comprises receiving a request for static content.

10. The method of claim 7, wherein the step of sending the first request for content to the origin server comprises selecting the origin server based upon a load-balancing algorithm.

11. The method of claim 7, wherein the step of sending identifier and the origin server's address to the client comprises inserting the identifier and the origin server's address in a cookie and sending the cookie to the client.

12. The method of claim 11, wherein, in the step of sending the second request for content, the second cache server determines that the client is bound to the origin server from the cookie.

13. The method of claim 11, wherein the step of sending the new origin server address to the client upon determining that the origin server has failed further comprises inserting a new origin server address into the cookie and sending the cookie to the client upon determining that the origin server has failed.

14. The method of claim 7, wherein the step of sending the identifier and the origin server's address to the client comprises inserting the identifier and the origin server address in a URL parameter.

15. The method of claim 14, wherein, in the step of sending the second request for content, the second cache server determines that the client is bound to the origin server from the URL parameter.

16. The method of claim 7, further comprising:
inserting the new origin server address into a URL parameter and sending the URL to the client upon detection of the failure of the origin server.

17. A method of operating cache servers in a content distribution network comprising:
receiving, via a user interface and from an operator of an origin server associated with a domain name in a content distribution network, a selection of a persistence option that comprises cache-server-based persistence, in which one or more cache servers in the content distribution network are responsible for establishing persistence by performing at least one action selected from a group of actions that are: (i) entering a client IP address and an origin server address in a look-up table; and (ii) entering a SSL session identifier and an origin server address in a look-up table;
receiving a first request for content from a client at a first cache server in a content distribution network;
sending the first request for content to an origin server upon determining that the first request for content from the client cannot be satisfied with content stored in a first cache associated with the first cache server;
receiving, at the first cache server, first content from the origin server;

sending the first content received from the origin server to the client;

inserting the origin server's address and at least one of a client IP address and a SSL session identifier in a table on the cache server;

distributing the table to at least one other cache server in the content distribution network;

receiving a second request for content from the client at a second cache server in the content distribution network;

sending a second request for content to the origin server upon determining that the second request for content from the client cannot be satisfied with content in a second cache associated with the second cache server and upon determining from the table that persistence is being used;

receiving second content at the second cache server from the origin server; and sending the second content received from the origin server to the client; and upon detection of a failure condition of the origin server by a cache server in the content distribution network, selecting, by the cache server that detected the origin server failure, a new origin server and inserting, by the cache server that detected the origin server failure, a new origin server address in the table.

18. The method of claim 17, wherein the step of receiving the first request for content comprises receiving a request for dynamic content.

19. The method of claim 17, wherein the step of receiving the first request for content comprises receiving a request for static content.

20. The method of claim 17, wherein the step of sending the first request for content to the origin server comprises selecting the origin server based upon a load-balancing algorithm.

21. The method of claim 17, wherein the step of distributing the table to at least one other cache server in the content distribution network comprises distributing the table to a subset of cache servers in the content distribution network.

22. The method of claim 17, wherein, in the step of sending the second request for content, the second cache server determines that the client is bound to the origin server by a look-up in the table.

23. The method of claim 22, wherein the step of inserting the origin server's address and at least one of a client IP address and a SSL session identifier in the table on the cache server comprises inserting a masked version of a client IP address associated with the client in the table.

24. A cache server in a content distribution network, comprising:

a subsystem that receives, via a user interface and from an operator of an origin server associated with a domain name in a content distribution network, a selection of at least one persistence option from among a plurality of persistence options that includes: cache-server-based persistence in which one or more cache servers in the content distribution network are responsible for establishing persistence, and origin-server-based persistence, in which one or more origin servers are responsible for establishing persistence;

wherein, for the selection by the operator of the origin server comprising cache-server-based-persistence, the one or more cache server's subsystems establishes an association between a client and an origin server by performing at least one action selected from a group of actions that are: (i) with the one or more of the cache server's subsystems, sending a cookie to the client, the cookie including both an identifier indicating use of session persistence and an address associated with the origin server; (ii) with the one or more of the cache server's subsystems, sending a URL to the client, the URL including both an identifier indicating use of session persistence and an address associated with the origin server; (iii) with one or more of the cache server's subsystems, entering a client IP address and the origin server address in a look-up table that associates the client with the origin server so as to establish session persistence; and (iv) with the one or more cache servers, entering a SSL session identifier and the origin server address in a look-up table that associates the session with the origin server so as to establish session persistence;

wherein, for the selection by the operator of the origin server comprising origin-server-based persistence, the one or more origin server's subsystems establishes an association between a client and an origin server by performing at least one action selected from a group of actions that are: (i) with the one or more origin server's subsystems, sending a cookie to the client via one or more cache servers, the cookie including both an identifier indicating use of session persistence and an address associated with an origin server; and (ii) with the one or more origin server's subsystems, sending a URL to the client via one or more cache servers, the URL including both an identifier indicating use of session persistence and an address associated with an origin server;

a subsystem that receives a first content request from the client at a cache server;

a subsystem that sends the first content request to an origin server upon determining that the first content request cannot be satisfied by content in a cache associated with the cache server, wherein the cache server selects the origin server based on the association between the client and the origin server established according to the at least one persistence option selected by the operator of the origin server;

a subsystem that receives first content at the cache server from the origin server in response to the first content request; and a subsystem that sends the first content to the client.

25. The cache server of claim 24, wherein the at least one persistence option is independently selectable for each of a plurality of sub-URLs associated with the domain name.

26. The cache server of claim 24, further comprising a subsystem that receives, via the user interface and from the operator, a selection of at least one of: cookie-based persistence, client IP-based persistence, and URL-based persistence.

27. The cache server of claim 24, wherein the subsystem that receives the first content request from the client is configured to receive a request for static content.

28. The cache server of claim 24, wherein the subsystem that receives the first content request from the client is configured to receive a request for dynamic content.

29. The cache server of claim 24, further comprising:

a subsystem that determines that the client does not have an association with any origin server; and a subsystem that selects an origin server from a plurality of origin servers associated with a specific domain name.

30. A content distribution network having a plurality of cache servers, comprising:
- a subsystem that receives, via a user interface and from an operator of an origin server associated with a domain name in a content distribution network, a selection of a persistence option that comprises cache-server-based persistence, in which one or more cache servers in the content distribution network are responsible for establishing persistence by sending a client at least one of (i) a cookie including both an identifier indicating use of session persistence and an address associated with an origin server, and (ii) a URL including both an identifier indicating use of session persistence and an address associated with an origin server;
- a subsystem that receives a first request for content from a client at a first cache server;
- a subsystem that sends the first request for content to an origin server upon determining that the first request for content from the client cannot be satisfied with content stored in a first cache associated with the first cache server;
- a subsystem that receives and stores first content from the origin server at the first cache server;
- a subsystem that sends the first content received from the origin server to the client;
- a subsystem that sends the identifier and the origin server's address to the client;
- a subsystem that receives a second request for content from the client at a second cache server in the content distribution network;
- a subsystem that sends a second request for content to the origin server upon determining that the second request for content from the client cannot be satisfied with content in a second cache associated with the second cache server and upon determining from the identifier that persistence is being used;
- a subsystem that receives second content at the second cache server from the origin server;
- a subsystem that sends the second content received from the origin server to the client; and
- a subsystem that, upon detection of a failure condition of the origin server by the second cache server, selects, with the second cache server, a new origin server and sends, with the second cache server, the new origin server address to the client.

31. The content distribution network of claim 30, wherein the subsystem that receives the first request for content is configured to receive a request for dynamic content.

32. The content distribution network of claim 30, wherein the subsystem that receives the first request for content is configured to receive a request for static content.

33. The content distribution network of claim 30, wherein the subsystem that sends the first request for content to the origin server is configured to select the origin server based upon a load-balancing algorithm.

34. The content distribution network of claim 30, wherein the subsystem that sends the new origin server address to the client upon detection of the failure condition of the origin server is configured to insert the new origin server address into a cookie and send the cookie to the client upon determining that the origin server has failed.

35. The content distribution network of claim 30, further comprising:
- a subsystem that inserts the new origin server address into a URL parameter and sends the URL to the client upon detection of the failure of the origin server.

36. A content distribution network having a plurality of cache servers, comprising:
- a subsystem that receives, via a user interface and from an operator of an origin server associated with a domain name in a content distribution network, a selection of a persistence option that comprises cache-server-based persistence, in which one or more cache servers in the content distribution network are responsible for establishing persistence by performing at least one action selected from a group of actions that are: (i) entering a client IP address and an origin server address in a look-up table; and (ii) entering a SSL session identifier and an origin server address in a look-up table;
- a subsystem that receives a first request for content from a client at the first cache server;
- a subsystem that sends first request for content to an origin server upon determining that the first request for content from the client cannot be satisfied with content stored in a first cache associated with the first cache server;
- a subsystem that receives, at the first cache server, first content from the origin server;
- a subsystem that sends the first content received from the origin server to the client;
- a subsystem that inserts the origin server's address and at least one of a client IP address and a SSL session identifier in a table on the cache server;
- a subsystem that distributes the table to at least one other cache server in the content distribution network;
- a subsystem that receives a second request for content from the client at a second cache server that is in the set of cache servers in the content distribution network;
- a subsystem that sends a second request for content to the origin server upon determining that the second request for content from the client cannot be satisfied with content in a second cache associated with the second cache server and upon determining from the table that persistence is being used;
- a subsystem that receives second content at the second cache server from the origin server; and
- a subsystem that sends the second content received from the origin server to the client; and
- a subsystem that, upon detection of a failure condition of the origin server by a cache server in the content distribution network, selects, by the cache server that detected the origin server failure, a new origin server and inserts, by the cache server that detected the origin server failure, a new origin server address in the table.

37. The content distribution network of claim 36, wherein the subsystem that receives the first request for content is configured to receive a request for dynamic content.

38. The content distribution network of claim 36, wherein the subsystem that receives the first request for content is configured to receive a request for static content.

39. The content distribution network of claim 36, wherein the subsystem that sends the first request for content to the origin server is configured to select the origin server based upon a load-balancing algorithm.

40. The content distribution network of claim 36, wherein the subsystem that distributes the table to at least one other cache server in the content distribution network is configured to distribute the table to a subset of cache servers in the content distribution network.

41. The content distribution network of claim 36, wherein, in the subsystem that sends the second request for content, the second cache server determines that the client is bound to the origin server by a look-up in the table.

42. The content distribution network of claim 41, wherein the subsystem that inserts the origin server's address and at least one of a client IP address and a SSL session identifier in a table on the cache server is configured to insert a masked version of a client IP address associated with the client in the table.

43. The method of claim 1, wherein the at least one selected persistence option comprises a cache-server-based persistence selection.

44. The method of claim 7, wherein the sending of the origin server's address and at least one of a client IP address and a SSL session identifier to the client is performed by the first cache server.

45. The apparatus of claim 24, wherein the at least one selected persistence option comprises cache-server-based persistence.

* * * * *